Patented Nov. 11, 1952

2,617,753

UNITED STATES PATENT OFFICE 2,617,753

FUNGISTATIC PREPARATIONS

Hans Gysin, Basel, and Ernst Hodel, Birsfelden, near Basel, Switzerland, assignors to J. R. Geigy A. G., Basel, Switzerland, a Swiss firm No Drawing. Application March 6, 1950, Serial No. 148,012. In Switzerland March 11, 1949

4 Claims. (Cl. 167—58)

This invention relates to a new fungistatic agent and provides composite fungistatic preparations, useful in controlling pathogenic fungi which cause affections of the human skin. These affections are serious human conditions of dermatology as well as of general hygiene.

It has been found that 2.9-dimethyl-1.10-phenanthroline has an excellent fungistatic efficacy. When this compound is combined with an appropriate pharmaceutic vehicle, valuable composite fungistatic preparations are obtained for treating mycotic conditions of the human skin.

2.9-dimethyl-1.10-phenanthroline is a known substance. It may be obtained by condensation of o-phenylenediamine, or of 8-aminoquinaldine with one or two mols of crotonaldehyde and has a melting point of 160° C. (see F. H. Case, J. Am. Chem. Soc., vol. 70 [1948], page 3994).

2.9-dimethyl-1.10-phenanthroline has proved to be very efficient against:

Trichophyton, e. g. *T. interdigitale*, and Epidermophyton, e. g. *E. floccosum*.

Non-fatty and fat containing ointments are suitable forms of application to combat fungi on human skin. Ointments of the oil in water emulsion type are a particularly advantageous form of application, as in these the active ingredient is still active in particularly large dilutions. Solutions in organic solvents which mix with water, such as alcohol, acetone, propylene glycol, glycerine (tinctures) and lotions which have to be shaken, are other suitable forms of application for the same purpose. 0.1–0.5% is the most advantageous concentration of active ingredient in these agents, but in certain cases higher or lower concentrations may be used.

To increase the range of action of 2.9-dimethylphenanthroline it can also be combined with known disinfectant bactericidal agents such as quaternary ammonium compounds, phenols, oxyquinoline derivatives, also with acaricidal or insecticidal agents such as crotonic acid-N-ethyl-o-toluidide or with other fungicidal agents such as sulphur, salicylic acid, propionic acid and their salts, sodium benzoate, organic mercury compounds.

Some typical forms of execution of the invention are described in the following examples without, however, limiting it to the same. Parts are always given as parts by weight where not otherwise stated, and temperatures are in degrees centigrade.

EXAMPLE A

To test the activity

The activity of 2.9-dimethyl-1.10-phenanthroline was determined according to the diffusion method in Agar (E. J. Foley and S. W. Lee, J. Amer. Pharm. Assoc. 1947, 198), which was modified a little for this purpose.

| Type of fungi | Concentration of active ingredient— | | Diameter of inhibited area (average) |
|---|---|---|---|
| | in solution | in ointment | |
| | Mols | Percent | |
| Trichophyton interdigitale | 1/50 | | 65 |
| | 1/100 | | 55 |
| | | 0.5 | 65 |
| | | 0.3 | 45 |
| Trichophyton asteroides | 1/50 | | 60 |
| | 1/100 | | 50 |
| Trichophyton rubrum | 1/50 | | 50 |
| | 1/100 | | 40 |
| Microsporum lanosum | 1/50 | | 65 |
| | 1/100 | | 55 |
| Microsporum audouini | 1/50 | | 60 |
| | 1/100 | | 50 |
| Candida albicans | 1/50 | | 45 |
| | 1/100 | | 40 |
| Nocardia asteroides | 1/10 | | 60 |
| | 1/50 | | 40 |
| Actinomyces madurae | 1/10 | | 45 |

EXAMPLE 1

Fat-containing ointment of the water in oil emulsion type

| | Parts |
|---|---|
| Active ingredient | 0.5 |
| Petroleum jelly | 35 |
| Wool fat | 30 |
| Paraffin oil | 14.5 |
| Water | 20 |
| | 100.0 |

The petroleum jelly, wool fat and paraffin oil are melted and the water added to form an emulsion. After cooling, the active ingredient is mixed into the ointment. The active ingredient can, however, be dissolved and incorporated at another phase. This can also be done in the following examples.

EXAMPLE 2

*Fat-containing ointment of the oil in water emulsion type*

|  | Parts |
|---|---|
| Emulsifying mixture | 15 |
| Paraffin oil | 7.5 |
| White beeswax | 5 |
| Distilled water | 72 |
| Active ingredient | 0.5 |
|  | 100.0 |

The emulsifying mixture (mixture of higher alcohols, their sulphonates and esters of higher fatty acids), wax and paraffin oil are melted and at 65° water of the same temperature is added to form an emulsion. The emulsion is stirred until cold and the active ingredient is then mixed in.

EXAMPLE 3

*Ointment free of fat*

|  | Parts |
|---|---|
| Active ingredient | 0.5 |
| Methyl cellulose | 3 |
| Glycerine | 10 |
| Water | 86.5 |
|  | 100.0 |

The methyl cellulose is thickened in water and on attaining the desired thickness, the active ingredient and glycerine are added.

Other thickening substances such as pectin, tragacanth, etc. can be used in the place of methyl cellulose.

EXAMPLE 4

*Ointment-like emulsion*

|  | Parts |
|---|---|
| Active ingredient | 0.5 |
| Stearic acid | 15 |
| Triethanolamine | 1.5 |
| Glycerine | 10 |
| Water | 73 |
|  | 100.0 |

The stearic acid is melted, the water, glycerine and triethanolamine are heated to 70° and then added to the molten stearic acid to form an emulsion. After cooling, the active ingredient is added.

EXAMPLE 5

*Lotion to be shaken*

|  | Parts |
|---|---|
| Active ingredient | 0.5 |
| Zinc oxide | 15 |
| Talc | 15 |
| Glycerine | 30 |
| Water | 39.5 |
|  | 100.0 |

The active ingredient, zinc oxide and talc are mixed together and then mixed with the glycerine and water. Titanium oxide may also be used instead of zinc oxide.

EXAMPLE 6

*Tincture*

Active ingredient, 0.5 part
Diluted alcohol, ad. 100.0 parts by volume

The active ingredient dissolves in alcohol. Also other solvents such as glycerine, isopropyl alcohol, acetone or mixtures of solvents may be used.

What we claim is:

1. A composite fungistatic preparation adapted for the treatment of mycotic conditions of the human skin comprising as its essential active fungistatic ingredient 2.9-dimethyl-1.10-phenanthroline uniformly distributed through an innocuous vehicle compatible with human skin and being a member selected from the group consisting of creamy vehicles, liquid vehicles comprising a water miscible organic solvent, and pulverulent vehicles dispersed in a water miscible organic solvent, said preparation being adapted to be administered to the affected tissue, said active ingredient being present in said preparation to the extent of from about 0.1% up to about 2.5%.

2. A composite fungistatic ointment adapted for the treatment of mycotic conditions of the human skin comprising as its essential active fungistatic ingredient 2.9-dimethyl-1.10-phenanthroline uniformly distributed through an innocuous creamy vehicle compatible with living human skin tissue, said preparation being adapted to be smeared over the affected skin, said active ingredient being present in said preparation to the extent of from about 0.1% up to about 2.5%.

3. A composite fungistatic preparation adapted for the treatment of mycotic conditions of the human skin comprising as its essential active fungistatic ingredient 2.9-dimethyl-1.10-phenanthroline uniformly distributed in an innocuous liquid vehicle compatible with living tissue and comprising a water miscible solvent, said preparation being adapted to be spread over the affected tissue, said active ingredient being present in said preparation to the extent of from about 0.1% up to about 2.5%.

4. A composite fungistatic preparation adapted for the treatment or prevention of mycotic conditions of the human skin comprising as its essential active fungistatic ingredient 2.9-dimethyl-1.10-phenanthroline uniformly distributed through an innocuous pulverulent vehicle compatible with living skin tissue and dispersed in a water miscible organic solvent, said preparation being adapted to be spread over the affected tissue, said active ingredient being present in said preparation to the extent of from about 0.5% up to about 2.5%.

HANS GYSIN.
ERNST HODEL.

REFERENCES CITED

The following references are of record in the file of this patent:

UNITED STATES PATENTS

| Number | Name | Date |
|---|---|---|
| 2,362,614 | Calva | Nov. 14, 1944 |